(No Model.) 2 Sheets—Sheet 1.

G. P. FENNER.
SHEET SPLITTING ATTACHMENT FOR PRINTING PRESSES.

No. 505,352. Patented Sept. 19, 1893.

WITNESSES:
William Miller
Chas. E. Svensgen

INVENTOR:
George P. Fenner
BY
Hauff & Hauff
ATTORNEYS.

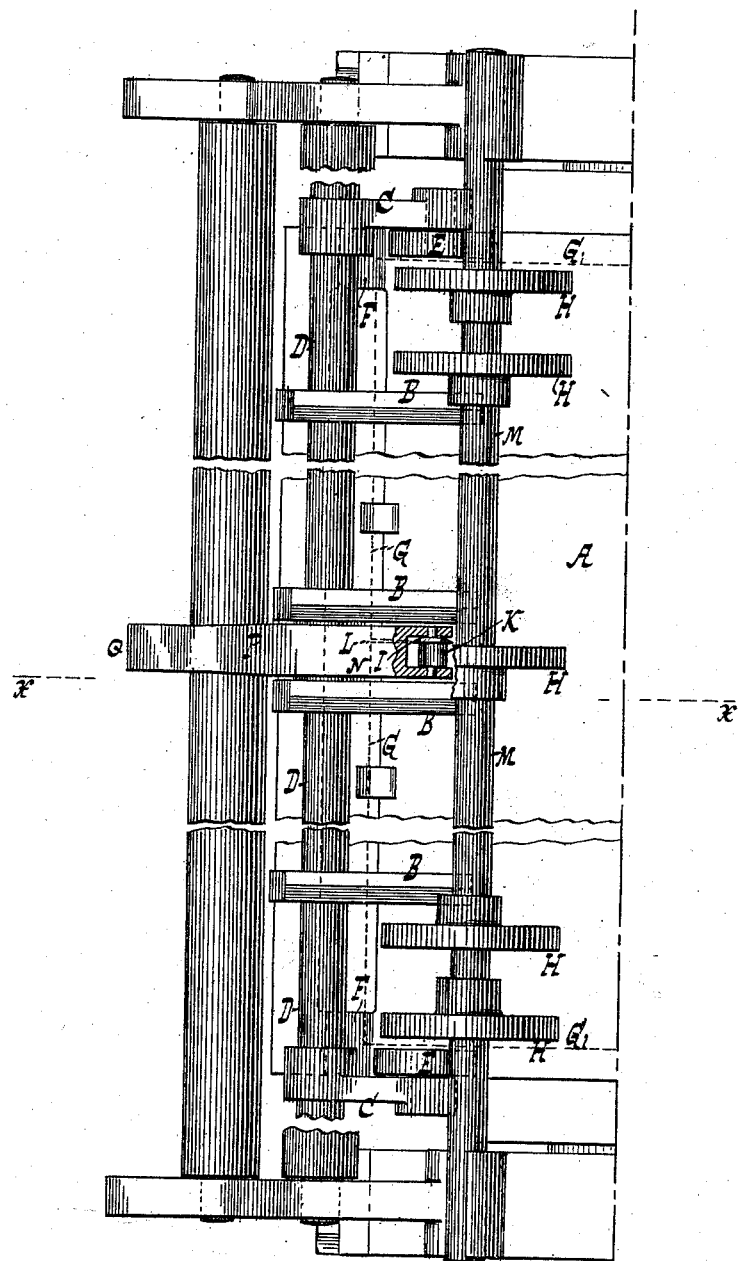

UNITED STATES PATENT OFFICE.

GEORGE P. FENNER, OF NEW LONDON, CONNECTICUT.

SHEET-SPLITTING ATTACHMENT FOR PRINTING-PRESSES.

SPECIFICATION forming part of Letters Patent No. 505,352, dated September 19, 1893.

Application filed April 27, 1893. Serial No. 472,101. (No model.)

*To all whom it may concern:*

Be it known that I, GEORGE P. FENNER, a citizen of the United States, residing at New London, in the county of New London and State of Connecticut, have invented new and useful Improvements in Sheet-Splitting Attachments for Printing-Machines, of which the following is a specification.

Figure 1:
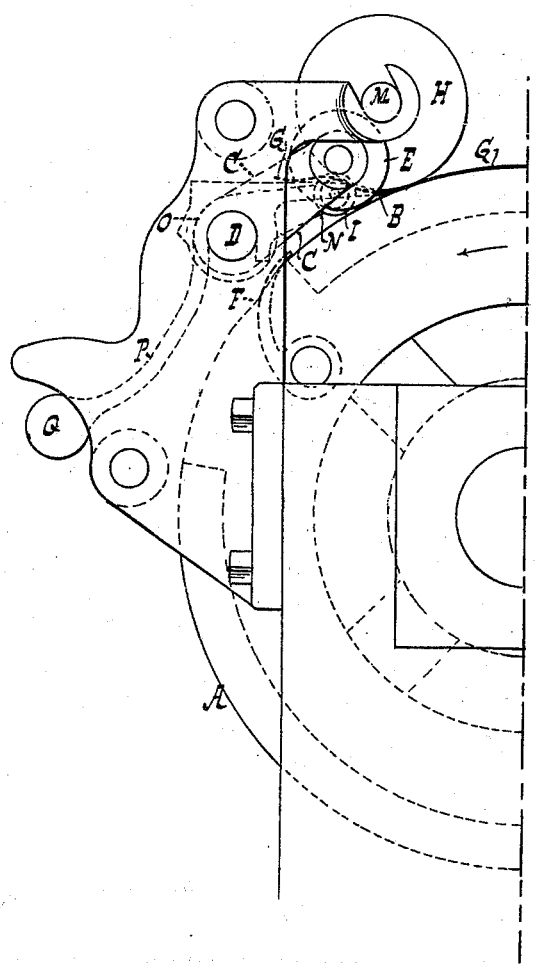
Figure 2:
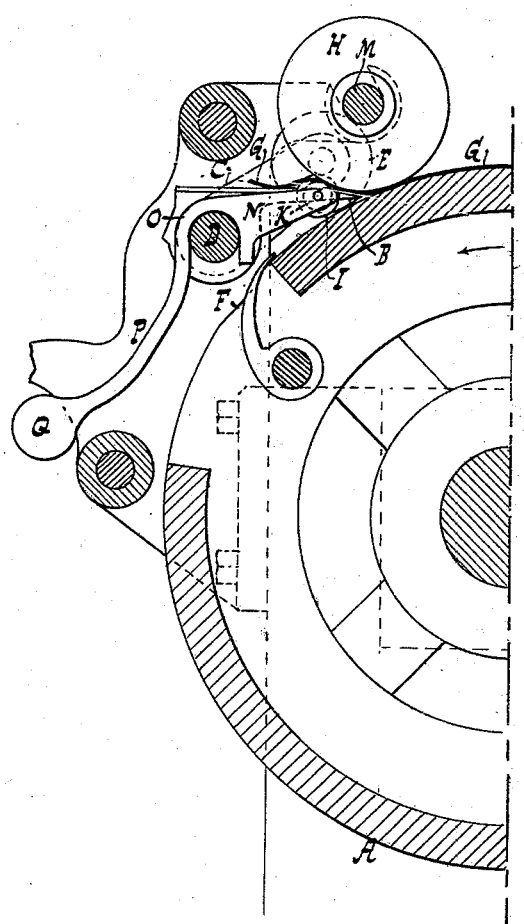

This invention relates to an improvement in sheet splitting attachments for printing machines and the invention consists in the novel features of construction set forth in the following specification and claims and illustrated in the annexed drawings in which—
Figure 1 is a side elevation of the sheet splitting attachment. Fig. 2 is a section along $x\ x$ Fig. 3. Fig. 3 is a plan view of Fig. 1.

In these drawings the letter A indicates an impression cylinder and B is a stripper or stripper finger for taking the sheet off the cylinder when released by the gripper of the latter. The finger B is secured to shaft D to which is fastened arm C having a roller E which at the proper moment drops into a groove or recess F at the proper point of the periphery of cylinder A so as to cause the finger B to dip onto the cylinder and to enter under the leading edge of the sheet G so as to strip the latter from the cylinder. The sheet in passing off the cylinder passes under the counter-disk H running in frictional contact with cylinder A and said sheet passing between the counter-disk H and the cutting disk I K will be split or cut as indicated at L L (Fig. 3). The counter-disk H rotates the cutting or splitting disk I K which is overbalanced so as to run in frictional contact with the disk H.

The cutting disk I K comprises two parts, the cutting edge or rim I made to project inside the periphery of the wheel H and the rim K made to run in frictional contact with the wheel.

The disk or wheel H is mounted on shaft M and is located above the sheet G and the cutting disk I K acts from underneath against the under side of the sheet. Said cutting disk I K is journaled in an arm N having a hook or seat O swinging on shaft D and provided with an arm P and weight Q overbalancing the cutting disk I K so as to hold the latter in contact with the counter disk H.

What I claim as new, and desire to secure by Letters Patent, is—

1. The combination with an impression cylinder of a counter disk H actuated by said cylinder and an overbalanced splitting disk or cutter made to run in frictional contact with the counter disk substantially as described.

2. The combination with an impression cylinder of a counter disk H actuated by said cylinder and an overbalanced splitting disk or cutter provided with a rim made to run in frictional contact with the counter disk and having a cutting edge made to project inside the periphery of the counter disk substantially as described.

3. The combination with an impression cylinder of a counter disk H located at the upper side of the sheet coming from the cylinder and an overbalanced splitting disk or cutter located at the under side of said sheet and made to act against the counter disk substantially as described.

In testimony whereof I have hereunto set my hand in the presence of two subscribing witnesses.

GEO. P. FENNER.

Witnesses:
 WILFRED D. WELLS,
 WALTER E. SPICER.